United States Patent

Milkov et al.

[11] 4,078,040
[45] Mar. 7, 1978

[54] METHOD OF EMPLOYING ELEMENTAL ZINC FOR THE PURIFICATION OF AQUEOUS SOLUTIONS OF METALLIC SALTS

[75] Inventors: Angel Dimitrov Milkov; Miladin Ivanov Kolarov; Nikola Tzanov Kunchev, all of Plovdiv; Iliya Marinov Iliev, Kardjali; Kostadin Stankov Spassov, Kardjali; Georgi Stoykov Buyukliev, Kardjali, all of Bulgaria

[73] Assignee: Nipki po Tzvetna Metalurgia, Plovdiv, Bulgaria

[21] Appl. No.: 726,492

[22] Filed: Sep. 27, 1976

Related U.S. Application Data

[63] Continuation-in-part of Ser. No. 532,189, Dec. 12, 1974, abandoned.

[30] Foreign Application Priority Data

Dec. 12, 1973   Bulgaria .................................. 25224

[51] Int. Cl.² ............................................... C01G 9/06
[52] U.S. Cl. .................................... 423/102; 423/544; 75/109
[58] Field of Search ....................... 423/544, 101, 102

[56] References Cited

U.S. PATENT DOCUMENTS

| | | | |
|---|---|---|---|
| 1,341,601 | 5/1920 | Sulman et al. | 423/544 X |
| 1,587,695 | 6/1926 | Campbell | 423/544 X |
| 1,733,676 | 10/1929 | Stevens et al. | 423/544 X |

FOREIGN PATENT DOCUMENTS

| | | | |
|---|---|---|---|
| 895,794 | 3/1972 | Canada | 423/544 |
| 138,954 | 2/1920 | United Kingdom | 423/544 |

*Primary Examiner*—Edward Stern

[57] ABSTRACT

An improved technique for purifying a solution of metallic salts from copper and cadmium contained in such solution is described. A bed of zinc granules is disposed on a grid at the bottom of a vertically arranged, cylindrical reaction chamber. The solution to be purified is pumped upwardly through the grid and the zinc bed at a speed in the range of 0.08–0.5 m/sec. to impart a turbulent motion to the zinc granules throughout the height of the reaction chamber. The turbulence causes the copper-cadmium cake adhering to the zinc particles during the reaction to separate from the granules, so that the separated cake flows out of the reaction chamber with the purified liquid to be quickly and easily removed therefrom.

2 Claims, 1 Drawing Figure

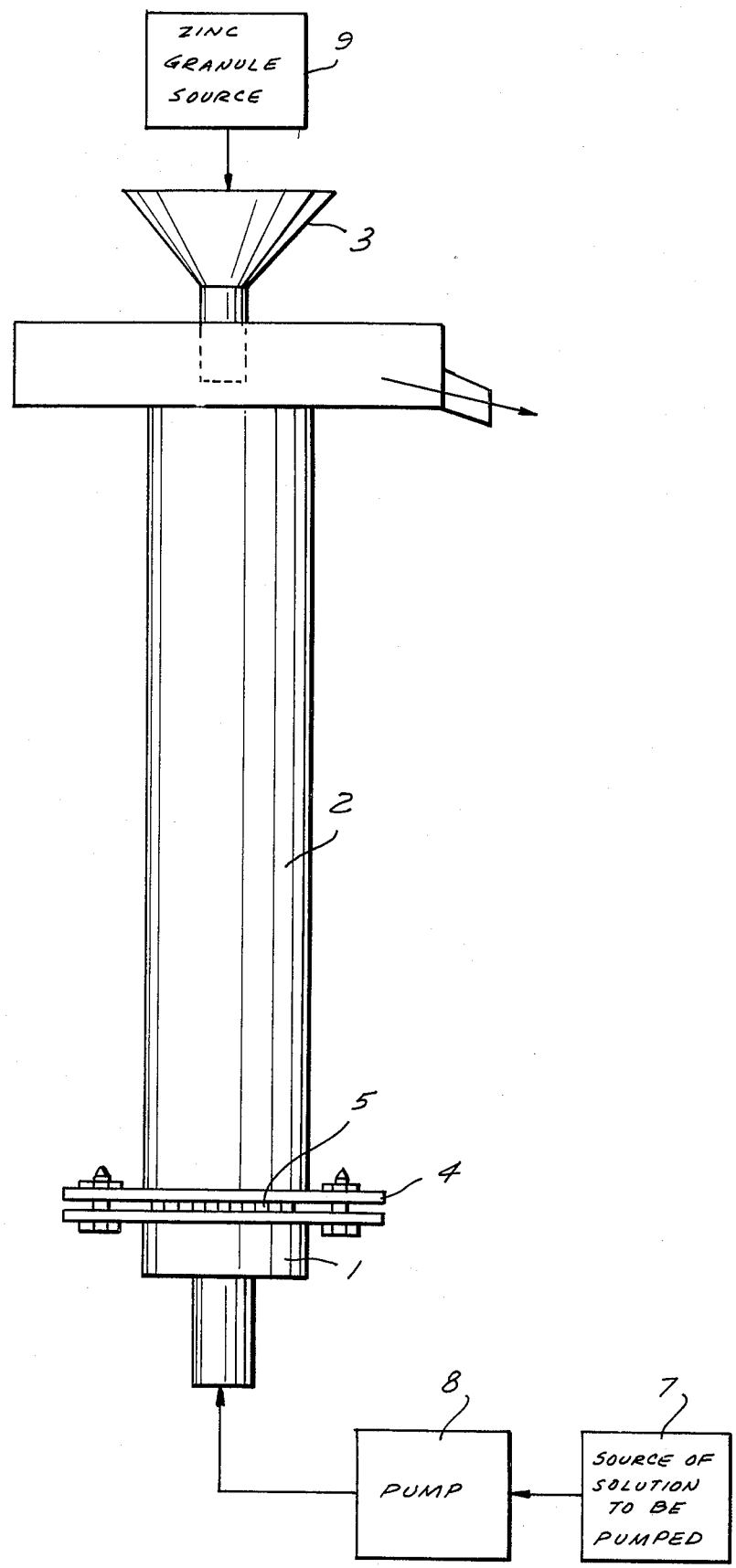

METHOD OF EMPLOYING ELEMENTAL ZINC FOR THE PURIFICATION OF AQUEOUS SOLUTIONS OF METALLIC SALTS

This is a continuation-in-part of application No. 532,189 filed Dec. 12, 1974, now abandoned.

BACKGROUND OF THE INVENTION

The invention relates to a method and apparatus employing elemental zinc for the purification of aqueous solutions of metallic salts (especially aqueous solutions of zinc sulfate) from copper and cadmium present in the solution.

In certain well-known techniques of this type, the purification is carried out by the reaction, on copper and cadmium salts in the solution, of zinc dust which is continually stirred in a container having a volume of 50–100 m$^3$. The reaction causes the copper and cadmium in the solution to solidify together in the form of a cake, which can then be removed, e.g., by filtration.

This method has been found to be disadvantageous in that the production of the required zinc dust is complicated and involves irreversible metallic losses. Moreover, the amount of zinc dust required is several times higher than the stoichiometric amount, and in any event is extremely high when a substantially complete purification (e.g., below 0.2 mgr/l) of the solution from the contained copper and cadmium is to be achieved. Additionally, in such method the purification step is lengthy, leading to the redissolution of the solidifed copper and cadmium in the purified solution.

In another well-known method of this type, the purification is accomplished with the use of a pulsating, densely packed column of zinc granules. The pulsating mechanism is conical in shape and typically exhibits a pulse amplitude of 1.5–3 cm and a frequency of 180–200 impulses per minute.

The second method is also disadvantageous in that the pulsations cause only insignificant displacements of the finely packed zinc granules, so that the resulting friction forces arising from the displacements of the granules are not strong enough to effect a complete separation of the copper-cadmium cake formed on the surface of the granules from the granular surface, so that the cake tends to stick to the granules. Accordingly, the cake grows more dense toward the surface of the granules and gradually disrupts the required contact between the solution and the zinc. As this phenomenon proceeds, the total reaction surface area of the granules is gradually reduced, and the unseparated cake remaining in the reaction chamber continually plugs the small pores between the granules. As a result, the reaction between the zinc and the remaining copper and cadmium salts in the solution becomes continually less effective.

SUMMARY OF THE INVENTION

The present invention provides a method and apparatus employing elemental zinc for the purification of solutions of zinc salts and the like from contained copper and cadmium, while avoiding the above-mentioned disadvantages.

In an illustrative technique, the solution to be purified is upwardly flowed at a high speed through a cylindrical reaction chamber in which a bed of zinc granules is disposed. The speed of flow is in the range of which yields a lifting force that exceeds the weight of the granules and results in a turbulent motion imparted to the zinc granules by the flowing liquid throughout the height of the cylindrical chamber, which preferably is greater than 6 m. The turbulent motion imparted to the granules sets up high frictional forces between the granules and the solution, between the granules and the walls of the reaction chamber, and between the granules themselves. Such high frictional forces continually loosen the copper-cadmium cake formed on the zinc granules, and the separated cake is thus permitted to continually flow out of the chamber with the purified liquid while the reactive surfaces of the zinc granules are constantly renewed. As a result, the cake can be quickly and easily separated from the purified liquid. The lower limit of the flow rate (e.g., 0.08 m/sec) is selected at a value below which the weight of the granules exceeds the lifting force of the fluid, while the upper limit of the upward flow rate (e.g., 0.5 m/sec) is chosen to prevent removal of the zinc granules from the solution along with the separated cake.

BRIEF DESCRIPTION OF THE DRAWING

The invention is further set forth in the following description taken in conjunction with the appended drawing, in which the single figure illustrates an apparatus for carrying out the improved technique in accordance with the invention for purifying aqueous solutions of metallic salts.

DESCRIPTION AND ILLUSTRATIVE EXAMPLE

In the inventive technique, an unpurified solution of zinc sulfate containing copper and cadmium sulfates is pumped at high speed (e.g., in the range of 0.08–0.50 m/sec.) into a cylindrical reaction chamber filled with zinc granules. As a result of the high speed of introduction of the solution, the granules in the chamber are subjected to an intense turbulent motion throughout the entire height of the reaction chamber. As a result of this, significant friction forces arise from the mutual contact among the granules themselves and among the granules and the walls of the reaction chamber and the upwardly moving solution.

Because of the turbulence, the cake of solidified copper and cadmium resulting from the reaction of the zinc with the copper and cadmium sulfates separates instantly from the surface of the zinc granules, and such separated cake exits from the reaction chamber along with the solution so that it can be quickly and easily removed from the solution.

Because of the continuous separation of the cake, the active zinc surface immediately goes into reaction with the remaining copper and cadmium salts (e.g., sulfates) in the solution, so that the purification process proceeds unabated.

The continuously active surface of the zinc granules resulting from this technique ensures a high speed, continuity and completeness of the reaction. The reaction speed is typically 2–3 sec. and is preferably carried out with a ratio of 1000 units of active solidifying agent to 1 unit of the solidified admixture of copper and cadmium. This method has the additional advantages of being able to employ zinc granules of low initial cost, and of resulting in a solution that is purified down to a trace content of the copper and cadmium without the use of excessive quantities of zinc. Additionally, it is found that the relative concentration of copper and cadmium in the solidified cake is 2-3 times richer than that resulting from previous purification techniques.

A suitable apparatus for carrying out the above-described process is shown in the drawing. A distributor 1 receives the solution to be purified from a source 7 under pressure supplied by a pump 8. The distributor 1 introduced the upwardly flowing solution into the bottom of a vertically disposed, cylindrical reaction chamber 2 via a grid 5. The grid supports a bed of zinc granules, which are supplied from a suitable source 9 and introduced into the top of the reaction chamber 2 via a hopper or funnel 3.

The chamber 2 is fixedly connected to the distributor 1 via a dual flange 4, with the grid 5 being supported between the flange walls as shown.

The cylindrical shape of the reaction chamber 2 has been found to be effective in achieving a constant speed of motion of the introduced solution along the entire length of the chamber 2. The actual cross sectional area of the reaction chamber, together with its height, are determined in any given application primarily by (a) the throughput and speed of the flowing solution, and (b) the desired degree of purification of the solution. In particular, the degree of purification of the solution will decrease in proportion to the velocity of flow of the liquid and to the degree of concentration of the impurities to be removed, and will increase in proportion to the solution temperature. It has been found that for good purification of the solution with a one-shot passage through the chamber 2, the height of the chamber should be in the range of 1–10 m (preferably) more than 6 m and that the solution temperature should be in the range of 40°–100° C.

The construction of the apparatus shown in the drawing is particularly advantageous in that the size of the solidifying portion of the arrangement is smaller by an order of magnitude than previous devices of this type, with a commensurate reduction in the cost.

The invention can be particularly illustrated by the following example:

The reaction chamber 2 was charged with a fixed, 5 meter high bed of zinc granules having a granular size of 1–5 mm. A solution containing copper and cadmium sulfate, and having a ph of 4.5–4.6 and a temperature of 43°–46° C was introduced into the distributor 1 at a speed of 0.15 m per sec., and the distributor in turn propelled the solution through the grid 5 and into the reaction chamber 2. In the resulting reaction process in the chamber, a spongy copper-cadmium cake was formed on the surface of the zinc granules. Such cake was immediately removed by the frictional forces set up by the high rate of speed of the solution through the granules. The surfaces of the zinc granules are renewed in situ for further reaction by the friction forces.

The solution exiting from the reaction chamber 2 was found to have a pH of 5.2–5.3, and was colored black due to the dispersed copper-cadmium cake carried along therewith. Brightening was achieved by letting the purified solution settle for about 2 minutes.

Table I below summarizes the results of four tests of the type just described, the separate tests representing different copper and cadmium concentrations in the liquid to be purified.

TABLE I

| No. No. | Content of the initial solution mgr/l | | Content of the purified solution mgr/l | | Content of the copper-cadmium cake, % | | |
|---|---|---|---|---|---|---|---|
| | Copper | Cadmium | Copper | Cadmium | Copper | Cadmium | Zinc |
| 1 | 280 | 460 | traces | 0.8 | 12.30 | 16.70 | 22.45 |
| 2 | 400 | 430 | traces | 0.5 | 15.60 | 18.95 | 15.20 |
| 3 | 250 | 450 | traces | traces | 16.11 | 30.47 | 5.30 |
| 4 | 300 | 470 | traces | traces | 16.96 | 28.30 | 7.20 |

In the foregoing, the invention has been described in connection with an illustrative method and apparatus thereof. Many variations and modifications will now occur to those skilled in the art. It is accordingly desired that the scope of the appended claims not be limited to the specific disclosure herein contained.

What is claimed is:

1. In a method of purifying an impure zinc sulfate solution containing impurities that consist of metallic sulfate salts of copper and cadmium, wherein the solution is contacted with elemental zinc particles at a temperature effective to cause the zinc to react with the solution so that the copper and cadmium precipitates as a cake on the surface of the zinc particles, the improvement which comprises the steps of substantially filling a single vertically disposed cylindrical reaction chamber with a fixedly grid supported bed of zinc granules to a height of greater than 6m, the quantity of zinc granules being chosen to establish a ratio of about 1000 units of the zinc granules to 1 unit of the cake; imparting a continuous turbulent motion to the zinc granules uniformly throughout the height of the cylindrical reaction chamber by contacting the turbulent zinc granules with the solution by flowing the solution upwardly through the turbulent column and out of the chamber in one pass at a velocity in the range of 0.08–0.5 m/sec. so that, because of such turbulence, high frictional forces between the granules and the solution, between the granules and the wall of the reaction chamber and between the granules themselves are generated which instantly separate, from all of the zinc granules, the cake of copper and cadmium precipitated on the surface of the zinc granules, whereby the surfaces of the zinc granules are renewed in situ for further reaction and whereby the upward flow of the purified solution out of the chamber is effective to carry the separated cake out of the chamber with it, and thereafter leaving the purified solution to settle for about two minutes to separate out the cake from the thus purified solution.

2. A method as defined in claim 1, in which the temperature of the solution is in the range of 43°–46° C.

* * * * *